United States Patent
Fischer et al.

(10) Patent No.: US 12,468,937 B2
(45) Date of Patent: Nov. 11, 2025

(54) DEVICE AND METHOD FOR TRAINING A CLASSIFIER USING AN INVERTIBLE FACTORIZATION MODEL

(71) Applicant: Robert Bosch GmbH, Stuttgart (DE)

(72) Inventors: Volker Fischer, Renningen (DE); Chaithanya Kumar Mummadi, Heimsheim (DE); Thomas Pfeil, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1013 days.

(21) Appl. No.: 17/448,110

(22) Filed: Sep. 20, 2021

(65) Prior Publication Data

US 2022/0101128 A1    Mar. 31, 2022

(30) Foreign Application Priority Data

Sep. 29, 2020    (EP) .................................... 20198965

(51) Int. Cl.
*G06N 3/08*    (2023.01)
*G06F 17/18*    (2006.01)

(52) U.S. Cl.
CPC ............... *G06N 3/08* (2013.01); *G06F 17/18* (2013.01)

(58) Field of Classification Search
CPC .......... G06N 3/08; G06N 3/048; G06N 3/088; G06N 3/04; G06F 17/18; G06F 17/16
See application file for complete search history.

(56) References Cited

U.S. PATENT DOCUMENTS

2021/0042457 A1*  2/2021  Manek ................. G05B 13/048
2022/0121934 A1*  4/2022  Duan ...................... G06N 3/045

FOREIGN PATENT DOCUMENTS

WO    2020152296 A1    7/2020

OTHER PUBLICATIONS

Behrmann et al., "Invertible Residual Networks," Proceedings of the 36th International Conference on Machine Learning (ICML), Long Beach, California, 2019, pp. 1-10. <http://proceedings.mlr.press/v97/behrmann19a/behrmann19a.pdf> Downloaded Sep. 16, 2021.
Kim et al., "Disentangling by Factorising," Proceedings of the 35th International Conference on Machine Learning, Stockholm, Sweden, PMLR 80, 2018, pp. 1-19.

* cited by examiner

*Primary Examiner* — Pei Yong Weng
(74) *Attorney, Agent, or Firm* — NORTON ROSE FULBRIGHT US LLP

(57) ABSTRACT

A computer-implemented method for training a classifier. The classifier is configured to determine an output signal characterizing a classification of an input signal. The training of the classifier includes: determining a first training input signal; determining a first latent representation comprising a plurality of factors based on the first training input signal by means of an invertible factorization model, wherein the invertible factorization model, determining a second latent representation by adapting at least one factor of the first latent representation; determining a second training input signal based on the second latent representation by means of the invertible factorization model; and training the classifier based on the second training input signal.

13 Claims, 10 Drawing Sheets

DEVICE AND METHOD FOR TRAINING A CLASSIFIER USING AN INVERTIBLE FACTORIZATION MODEL

CROSS REFERENCE

The present application claims the benefit under 35 U.S.C. § 119 of European Patent Application No. EP 20198965.4 filed on Sep. 29, 2020, which is expressly incorporated herein by reference in its entirety.

FIELD

The present invention concerns a method for obtaining an adversarial input signal, a method for using and/or training a classifier, a method for assessing a robustness of said classifier, and a method for operating an actuator, a computer program and a machine-readable storage medium, a classifier, a control system, and a training system.

BACKGROUND INFORMATION

Jens Behrmann, Will Grathwohl, Ricky T. Q. Chen, David Duvenaud, Jorn-Henrik Jacobsen, "Invertible Residual Networks," https://arxiv.org/abs/1811.00995v3, May 18, 2019 describe a method for inverting a neural network.

SUMMARY

Classifiers, especially if based on deep neural networks, typically require a substantial amount of labeled training data. The training data is preferably chosen such that the classifier is able to learn variations in the data to which it shall become invariant or equivariant. For example, when the classifier is configured to classify images, a generally preferred feature of the classier would be to be invariant with respect to changes in contrast of an image.

In order to train a classifier to be invariant or equivariant to certain variations, data augmentation can be used. The goal of data augmentation is to obtain at least one new training datum based on an already existing training datum by applying some form of transformation to the already existing training datum, preferably such that the transformed training datum still shares a same desired classification with the original training datum, i.e., the transformation is label preserving. This allows for obtaining more training data, which leads to the classifier being able to learn more variations of the data it shall be invariant or equivariant to, which in turn leads to a better classification accuracy of the classifier.

However, existing augmentation approaches typically only allow for a rather limited amount of invariances that can be learned. An advantage of the method in accordance with an example embodiment of the present invention is that a training datum can be augmented based on low-level factors, e.g., brightness, noise or contrast, as well as based on high-level factors, e.g., rotation of an object in a given scene. The approach allows for presenting the classifier with more data of factors the classifier shall be invariant or equivariant to, which in turn increases the classification accuracy of the classifier even further.

In a first aspect, the present invention concerns a computer-implemented method for training a classifier, wherein the classifier is configured to determine an output signal characterizing a classification of an input signal. In accordance with an example embodiment of the present invention, In accordance with an example embodiment of the present invention, training the classifier includes the following steps:

Determining a first training input signal;
Determining a first latent representation comprising a plurality of factors based on the first training input signal by means of an invertible factorization model, wherein the invertible factorization model is characterized by:
  A plurality of functions, wherein any one function from the plurality of functions is continuous and almost everywhere continuously differentiable, wherein the function is further configured to accept either the training input signal or at least one factor provided by another function of the plurality of functions as an input and wherein the function is further configured to provide at least one factor, wherein the at least one factor is either provided as at least part of the latent representation or is provided as at least part of an input of another function of the plurality of functions, wherein there exists an inverse function that corresponds with the function, is continuous, is almost everywhere continuously differentiable and is configured to determine the input of the layer based on the at least one factor provided from the function;
Determining a second latent representation by adapting at least one factor of the first latent representation;
Determining a second training input signal based on the second latent representation by means of the invertible factorization model;
Training the classifier based on the second training input signal.

An input signal may comprise or may be composed of at least one image. The image may be obtained from a sensor, e.g., a camera sensor, a LIDAR sensor, a radar sensor, an ultrasonic sensor or a thermal camera. The image may also be obtained from a rendering of a simulation, e.g., a virtual environment created in a computer. It may also be provided that the image is digitally drawn. In particular, the input signal may also comprise images of different modalities or from different sensors of the same type. For example, the input signal may comprise two images obtained from a stereo camera. As another example, the input signal may also comprise an image form a camera sensor and a LIDAR sensor.

An input signal may also comprise an audio signal, e.g., recordings from a microphone or audio data obtained from a computer simulation or from being digitally generated by a computer. The audio signal may characterize a recording of speech. Alternatively or additionally, the audio signal may characterize a recording of audio events such as sirens, alarms or other notification signals.

The training input signal may be obtained from a database storing training input signals for the classifier.

Alternatively, the training input signal may be obtained from a sensor directly.

An output signal may assign at least one label to an input signal characterizing a classification of the input signal. For example, if the input signal comprises an image, the output signal may characterize a single class the classifier deems the image to belong to. Alternatively or additionally, the output signal may characterize a classification of an object in the image as well as a location of the object, i.e., the classifier may be configured for object detection. Alternatively or additionally, the classifier may assign each pixel in the image a class which the classifier deems the pixel to belong to, i.e., the classifier may be configured for semantic segmentation.

It can also be provided that, if an input signal comprises audio data, the output signal may assign a class to the input signal which the classifier deems the audio data to belong to. Alternatively or additionally, the output signal may also characterize an audio event comprised in the audio signal and/or its location within the audio signal.

The invertible factorization model may be understood as a machine learning model. The invertible factorization model takes an input signal as an input and provides a latent representation, i.e., a plurality of factors, as an output. As each function comprised in the invertible factorization model is invertible, the input signal can be reconstructed from the latent representation. Viewing the invertible factorization model as part of a neural network, this may be understood as a backward pass of the latent representation to obtain the input signal. The invertible factorization model may be understood as a generative model.

A function from the plurality of functions and the function's corresponding inverse function may be understood as a layer or a plurality of layers of the invertible factorization model, wherein the function can be used for a forward pass of an input of the layer to obtain an output of a layer and the inverse function can be used for a backward pass, i.e., obtaining an input from an output of the layer. By definition, the functions of the invertible model and hence the invertible model itself is exactly invertible. That is, if a latent representation is obtained from the invertible factorization model for an input signal, the input signal can be exactly reconstructed from the latent representation.

The flow of information in the invertible factorization model determines an order of its functions. If a first function provides a factor to a second function, the first function is considered to precede the second function and the second function is considered to follow the first function.

Surprisingly, the inventors found that by the design of the invertible factorization model, at least some of the factors of the latent representation are disentangled. A factor may be understood as disentangled if starting at any given input signal some direction in the vector space of the input signal can be found that changes only this factor while leaving all other factors relatively unchanged. Disentanglement can hence be understood as a continuous measure of a factor. A factor may hence be regarded as disentangled if a change in the direction in vector space corresponding to the input signal does not change another factor more than a predefined threshold.

Adapting the first latent representation may be understood as changing at least one factor of the first latent representation such that a desired effect is obtained. For example, if the first training input signal shall be augmented by a contrast transformation, a factor of the first latent representation relating to contrast could by altered to obtain the second latent representation. The second latent representation can then be processed by the invertible factorization model in order to determine the second training input signal.

It is also possible that more than one factor of the first latent representation is changed, e.g., to augment the first training input signal with respect to more than one variation.

It can be further provided that the classifier comprises the invertible factorization model and the output signal is determined based on a latent representation of the input signal, wherein the latent representation is determined by means of the invertible factorization model.

Disentangled factors are advantageous as they allow for factorizing an input signal, i.e., separate the input signal into semantic aspects. For example, one first factor may change if the color of an object in an images comprised in the input signal changes. A second factor may change if the contrast of the image changes. A third factor may change according to the number of tires that can be seen in the image. This is advantageous as the internal classifier bases its decision on the factors. If, for example, the internal classifier relies on the first and second factor to classify the input signal as containing a car, this indicates a strong bias of the classifier towards color and contrast, two semantic features which do not necessarily allow for drawing the conclusion that the image contains a car. In this case, a user of the classifier can identify this ill-suited connection between factor and classification and train the classifier with new data to get rid of the bias of the classifier towards color and contrast. The disentangled factors hence allow for a direct insight into the inner workings of the classifier and may guide the user to train the classifier to achieve a better classification performance.

Another advantage of the disentangled factors provided by the invertible factorization model is that they allow for robustly assessing semantic features, i.e., factors, of the input signal. As the factors are robust, the classification of the classifier is also more robust and hence more accurate after training.

Another advantage of the invertible factorization model is that the latent representation can comprise factors from different functions of the invertible factorization model. For example, it can be provided that the plurality of functions comprises at least one function that provides a first factor to the latent representation and provides a second factor to another function from the plurality of functions.

This is advantageous as the functions of the invertible model are capable of extracting more and more abstract information from the input signal. For example, a function closer to the input signal comprising an input image may extract factors relating to color or contrast of the image while functions closer to the latent representation may extract high level factors relating to, e.g., number of objects in the image. Similarly, when the input signal comprises audio signals, functions closer to the input signal may extract factors relating to amplitude or frequency of the audio signal while factors closer to the latent representation may extract high level factors relating to, e.g., number of speakers that can be heard in the audio signal.

In contrast to other generative models that provide their latent representation based on the output of a single function, i.e., autoencoders, providing factors to the latent representation from different functions of the invertible model allows for the functions closer to the latent representation not having to carry information about low-level factors (e.g., color, contrast, amplitude) through the invertible factorization model if they are not relevant for the functions, i.e., not required to determine the high-level factors. This way, the capacity of the invertible factorization model is not burdened by having to carry unnecessary information through the model which in turn allows the functions closer to the latent representation to extract more high-level factors as the model has the capacity to focus on the high-level factors. In turn, high-level factors enable the classifier to base its classification on more reliable information and hence improve the classification accuracy of the classifier.

Determining a semantic aspect a factor of the latent representation relates to can, for example, be done by means of an ablation test. For example, a user can provide data, wherein each datum differs from the other data only in a single aspect. For example, a user could provide a plurality of images, wherein each image has been obtained from a single image by applying a random contrast transformation. This way, all images show the same content and only differ in the aspect "contrast". The user could then determine a factor of the latent representations that changes with respect to a change in contrast, i.e., changes with respect to the plurality of images. This factor of the latent representation hence carries semantic information about the contrast in a given input image. The same approach could be chosen for more high-level aspects such as number of objects that can be seen in an image.

Alternatively, a semantic aspect of a factor may also be determined by determining the latent representation for a given input signal, varying the factor of the latent representation and obtaining a new input signal from the varied latent representation.

It can be further provided that the classifier is trained based on a first difference between a determined output signal and a desired output, wherein the determined output signal is determined for a training input signal and the desired output signal characterizes a desired classification of the training input signal.

As the invertible model and the internal classifier can configured such that they characterize chained mathematical functions, they can be trained like neural networks, e.g., through backpropagation. This can be achieved by determining an output signal for an input signal, determining the first difference of the determined output signal and the determined output signal, determining a gradient of a plurality of parameters of the classifier with respect to the difference and updating the parameters based on the gradient.

Surprisingly, the inventors found that even more factors become disentangled when training a plurality of parameters of the invertible factorization model with respect to the difference. In turn, this further helps a user to identify the semantic entities of an input signal the classifier bases its decision on and also further improves the classification accuracy of the classifier.

It can be further provided that the plurality of functions of the invertible factorization model comprises at least one function that is configured to provide two factors according to the formula $$f(x^{(i)})=(z_1,z_2)=(\varepsilon(x^{(i)}),x^{(i)}-\mathcal{D}(\varepsilon(x^{(i)}))),$$

wherein $x^{(i)}$ is an input of the function, $z_1$ is a first factor, $z_2$ is a second factor, $\varepsilon$ is an encoder of an autoencoder and $\mathcal{D}$ is a decoder of the autoencoder, further wherein an inverse function corresponding with the function is given by $$f^{-1}(z_1,z_2)=\mathcal{D}(z_1)+z_2.$$

The advantage of this approach is that the encoder allows for compressing an information contained its input. The factors extracted this way hence convey more high-level information with all the advantages described above.

The encoder and/or decoder may both be neural networks.

It can be further provided that the method for training comprises a further step of training the encoder and/or the decoder based on a loss function $$l(x^{(i)})=\Sigma(x^{(i)}-\mathcal{D}(\varepsilon(x^{(i)})))^2,$$

wherein $x^{(i)}$ is an input of the function and the sum is over all squared elements of the subtraction.

The inventors found that this approach disentangles the factors provided by the invertible factorization model even further and hence allows for training the classifier to become invariant to even more factors.

It can be further provided that the plurality of functions of the invertible factorization model comprises at least one function that is configured to provide three factors according to the formula $$f(x^{(i)})=(z_1,z_2,z_3),$$

wherein $x^{(i)}$ is the input of the function, $z_1$ is a first factor and a result of applying a group normalization to the input $x^{(i)}$, $z_2$ is a second factor and an expected value of the group normalization, $z_3$ is a third factor and a standard deviation of the group normalization and the group normalization further depends on a scale parameter $\gamma$ and a shift parameter $\beta$, wherein an inverse of the function is given by $$f^{-1}(z_1,z_2,z_3)=z_3\frac{z_1-\beta}{\gamma}+z_2.$$

An advantage of this function is that the group normalization smoothes the gradients of the plurality of parameters of the invertible factorization model which in turn leads to a faster training of the classifier. Given the same amount of time, faster training hence leads to the classifier being able to be trained with more input signals which in turn improves the performance of the classifier.

It can be further provided the plurality of functions comprises at least one function that provides two factors according to the formula $$f(x^{(i)})=(z_1,z_2)=(\text{ReLU}(x^{(i)}),\text{ReLU}(-x^{(i)})),$$

wherein $x^{(i)}$ is the input of the function, $z_1$ is a first factor, $z_2$ is a second factor and ReLU is a rectified linear unit, further wherein the inverse function for the function is given by $$f^{-1}(z_1,z_2)=z_1-z_2.$$

An advantage of using this function in the invertible factorization model is that the invertible factorization model becomes a non-linear model. The invertible factorization model is hence capable of extracting factors in a non-linear fashion.

The invertible factorization model can hence determine factors that have a non-linear relationship with the input signal. As high-level factors typically have a non-linear relationship with the input signal, this approach allows for disentangling these factors, which in turn allows for obtaining more disentangled factors. This leads to a higher classification accuracy of the classifier as explained above.

It can be further provided that training the classifier comprises a step of training the invertible factorization model by adapting a plurality of parameters of the invertible factorization model according to a loss function $$l(z)=\|z-f(f^{-1}(z))\|_2^2,$$

wherein z is a latent representation, $f(\cdot)$ describes applying the invertible factorization model to an input signal in order to obtain a latent representation and $f^{-1}(\cdot)$ describes applying the invertible factorization model to a latent representation in order to obtain an input signal.

The plurality of parameters may comprise trainable parameters comprised in the functions of the invertible factorization model, e.g., weights of an encoder or shift or scale parameters of a group normalization.

The inventors found that training the invertible factorization model this way even further increases the disentanglement of the factors, which leads to an increase in classification accuracy of the classifier as discussed above.

It can also be provided that training the classifier further comprises a step of training the invertible factorization model by means of a neural architecture search algorithm, wherein an objective function of the neural architecture search algorithm is based on a disentanglement of a plurality of factors of a latent representation provided by the invertible factorization model.

This approach is advantageous as having a more disentangled latent representation improves the classification accuracy of the classifier even further.

Training the invertible factorization model by means of a neural architecture search (also known as NAS) can be understood as determining an architecture of the invertible factorization model, in particular the functions from the plurality of functions of the invertible model, such that training the classifier leads to a best-possible disentanglement of the factors.

As the functions (and their respective inverse functions) can be understood as layers of a neural network, the invertible factorization model can be trained according to any NAS algorithm.

The goal of applying a NAS algorithm can be understood as finding an invertible factorization model that maximizes a disentanglement of its factors. Hence, as objective function for the NAS algorithm, any conventional disentanglement metric may be used, e.g., betaVAE, FactorVAE, Mutual Information Gap or DCI Disentanglement.

Preferably, a NAS algorithm is chosen that is capable of multi-objective optimization, e.g., LEMONADE. This is preferable as the architecture of the invertible factorization model can be trained to optimize both the disentanglement of the latent representation and a classification accuracy of the classifier. However, single-objective NAS algorithms are possible as well.

For these algorithms, a disentanglement metric may be used as objective function.

It can be further provided that a device is controlled based on the output signal of the classifier.

This is advantageous as the increased classification performance leads to a better operation of the device.

Example embodiments of the present invention will be discussed with reference to the following figures in more detail.

DETAILED DESCRIPTION OF EXAMPLE EMBODIMENTS

Figure 1:
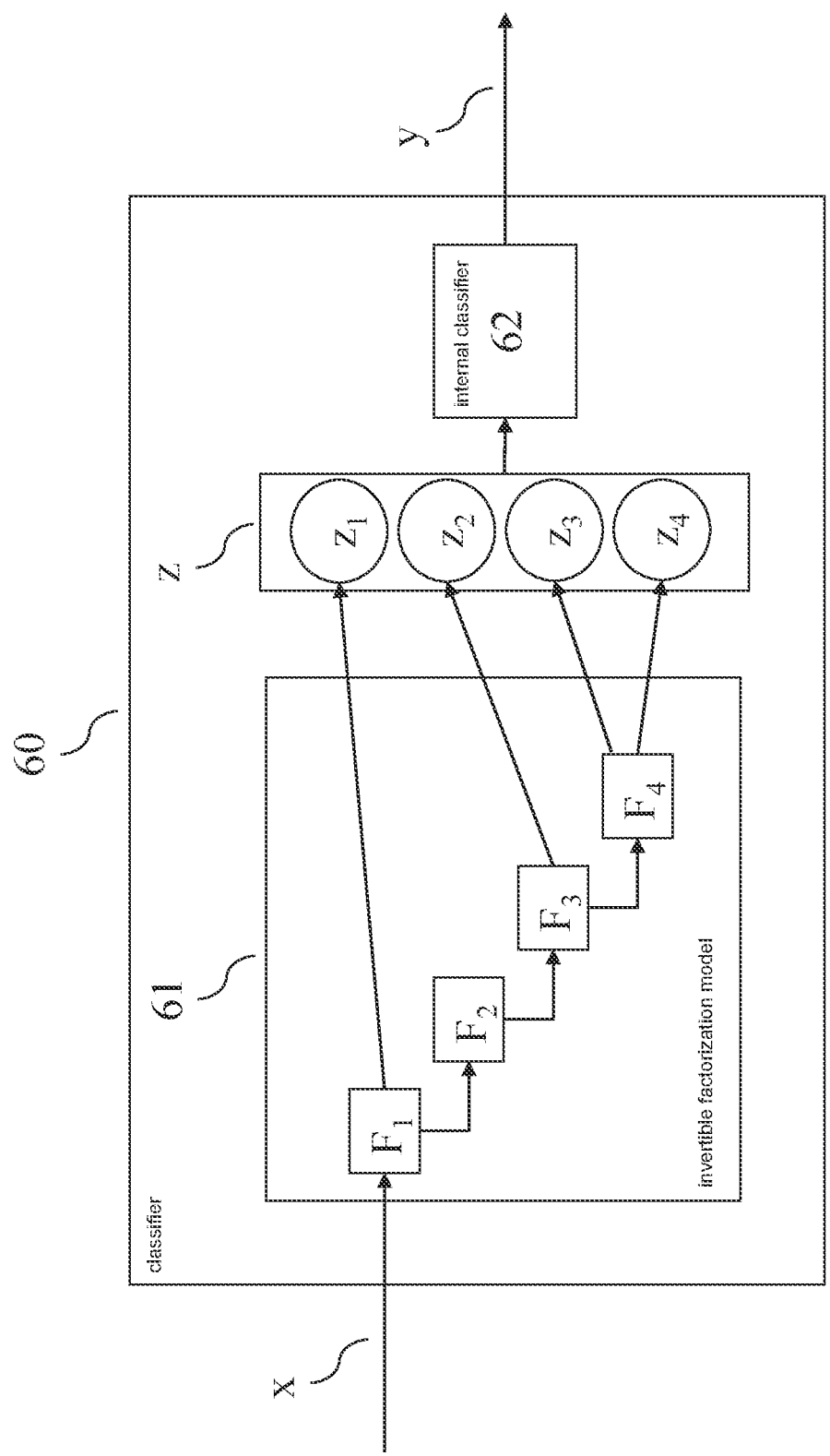
FIG. 1 shows a classifier in accordance with an example embodiment of the present invention.

Shown in FIG. 1 is an embodiment of a classifier (60) for determining an output signal (y) characterizing a classification of an input signal (x), wherein the classifier comprises an invertible factorization model (61) and an internal classifier (62).

The input signal (x) is provided to the invertible factorization model and is processed by a plurality of functions ($F_1$, $F_2$, $F_3$, $F_4$). A first function ($F_1$) accepts the input signal as input and provides a first factor ($z_1$) to a latent representation (z) and a second factor to a second function ($F_2$). Based on the second factor, the second function ($F_2$) determines a third factor. The third factor is provided to a third function ($F_3$). Based on the third factor, the third function ($F_3$) provides a fourth factor ($z_2$) to the latent representation (z) and a fifth factor to a fourth function ($F_4$). Based on the fifth factor, the fourth function ($F_4$) then provides a sixth factor ($z_3$) and a seventh factor ($z_4$) to the latent representation (z).

The latent representation (z) is then forwarded to the internal classifier (62), which is configured to determine the output signal (y) based on the latent representation (z). As internal classifier (62), a linear classifier is used in the embodiment, e.g., a logistic regression classifier. In further embodiments, other internal classifiers (62) may be used as well.

In even further embodiments, the invertible factorization model (61) may comprise functions different from the ones described in this embodiment.

Figure 2:
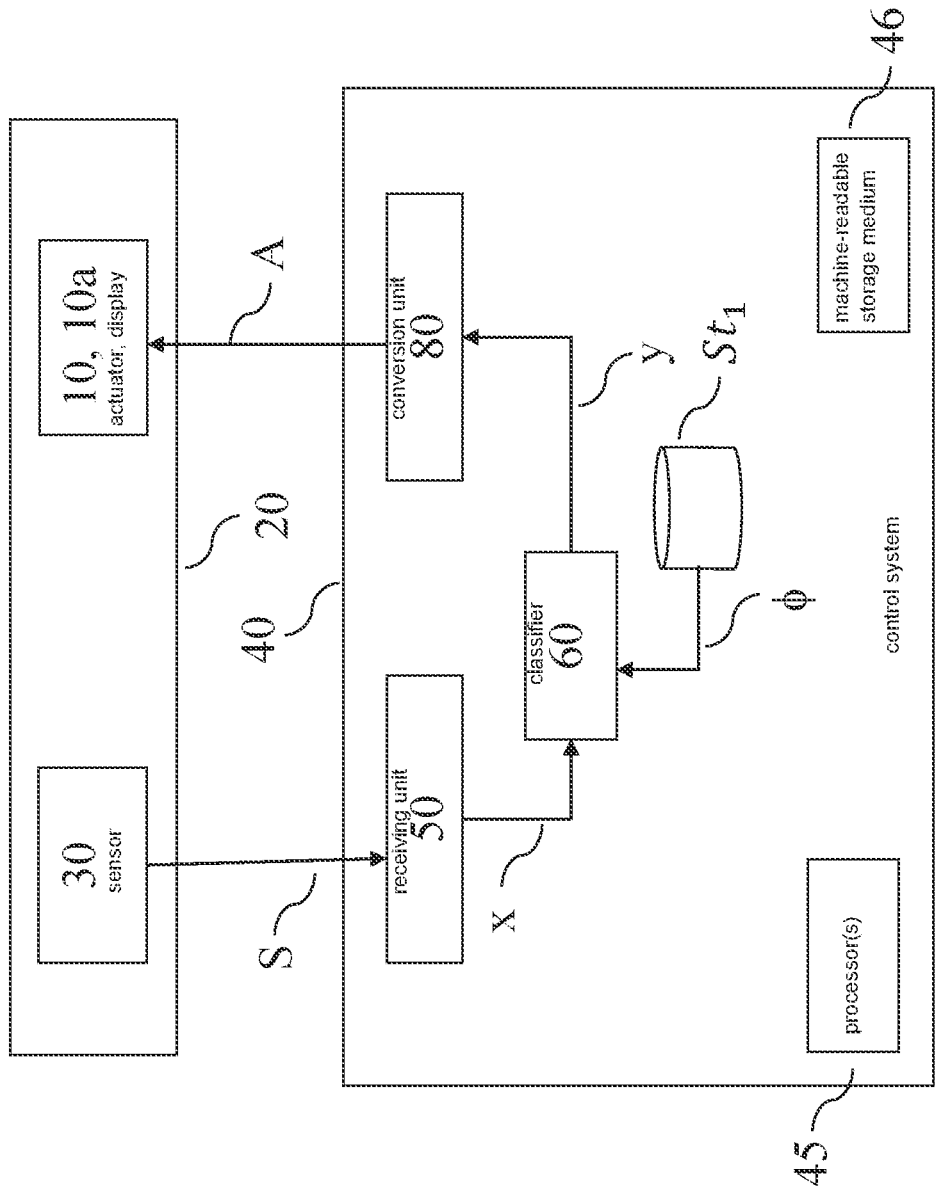
FIG. 2 shows a control system comprising a classifier controlling an actuator in its environment, in accordance with an example embodiment of the present invention.

Shown in FIG. 2 is a control system (40) for controlling an actuator (10) based on the output signal (y) of the classifier (60). At preferably evenly spaced points in time, a sensor (30) senses a condition of the actuator system. The sensor (30) may comprise several sensors. Preferably, the sensor (30) comprises an optical sensor that takes images of the environment (20), e.g., a camera. Alternatively or additionally, the sensor (30) may also comprise an audio sensor, e.g., a microphone. An output signal (S) of the sensor (30) (or, in case the sensor (30) comprises a plurality of sensors, an output signal (S) for each of the sensors) which encodes the sensed condition is transmitted to the control system (40).

Thereby, the control system (40) receives a stream of sensor signals (S). It then computes a series of control signals (A) depending on the stream of sensor signals (S), which are then transmitted to the actuator (10).

The control system (40) receives the stream of sensor signals (S) of the sensor (30) in an optional receiving unit (50). The receiving unit (50) transforms the sensor signals (S) into input signals (x). Alternatively, in case of no receiving unit (50), each sensor signal (S) may directly be taken as an input signal (x). The input signal (x) may, for example, be given as an excerpt from the sensor signal (S). Alternatively, the sensor signal (S) may be processed to yield the input signal (x). In other words, the input signal (x) is provided in accordance with the sensor signal (S).

The input signal (x) is then passed on to the classifier (60).

The classifier (60) is parametrized by parameters ($\phi$) which are stored in and provided by a parameter storage ($St_1$).

The classifier (60) determines an output signal (y) from the input signals (x). The output signal (y) is transmitted to an optional conversion unit (80), which converts the output signal (y) into the control signals (A). The control signals (A) are then transmitted to the actuator (10) for controlling the actuator (10) accordingly. Alternatively, the output signal (y) may directly be taken as control signal (A).

The actuator (10) receives control signals (A), is controlled accordingly and carries out an action corresponding to the control signal (A). The actuator (10) may comprise a control logic which transforms the control signal (A) into a further control signal, which is then used to control actuator (10).

In further embodiments, the control system (40) may comprise the sensor (30). In even further embodiments, the control system (40) alternatively or additionally may comprise an actuator (10).

In still further embodiments, it can be provided that the control system (40) controls a displaying device (10a) instead of or in addition to the actuator (10).

Furthermore, the control system (40) may comprise at least one processor (45) and at least one machine-readable storage medium (46) on which instructions are stored which, if carried out, cause the control system (40) to carry out a method according to an aspect of the present invention.

Figure 3:
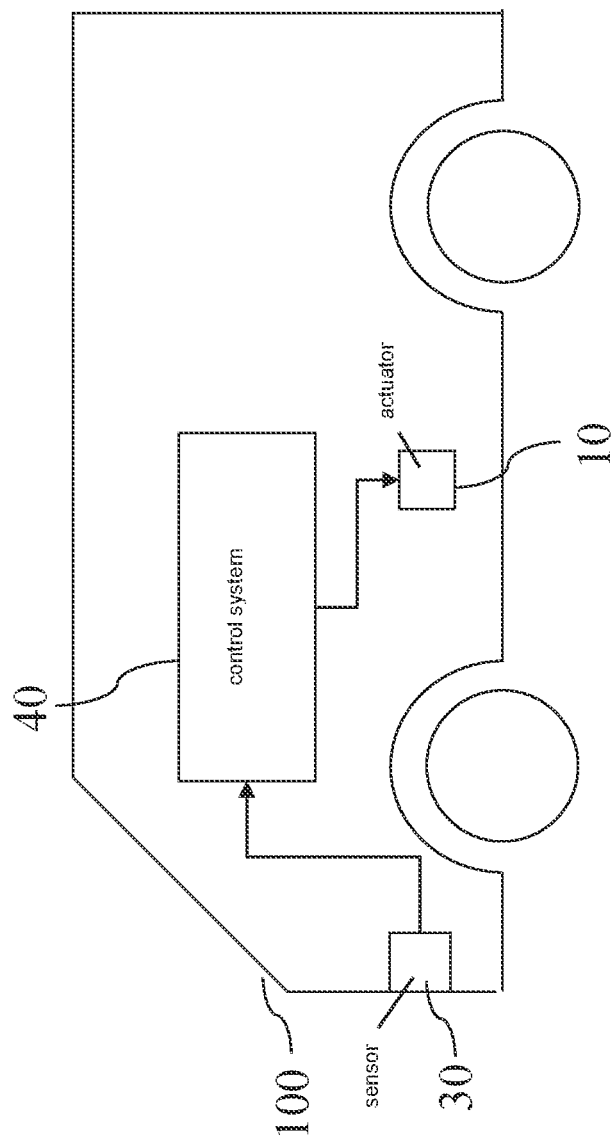
FIG. 3 shows the control system controlling an at least partially autonomous robot, in accordance with an example embodiment of the present invention.

FIG. 3 shows an embodiment in which the control system (40) is used to control an at least partially autonomous robot, e.g., an at least partially autonomous vehicle (100).

The sensor (30) may comprise one or more video sensors and/or one or more radar sensors and/or one or more ultrasonic sensors and/or one or more LiDAR sensors. Some or all of these sensors are preferably but not necessarily integrated in the vehicle (100). The input signal (x) may hence be understood as an input image and the classifier (60) as an image classifier.

The image classifier (60) may be configured to detect objects in the vicinity of the at least partially autonomous robot based on the input image (x). The output signal (y) may comprise an information, which characterizes where objects are located in the vicinity of the at least partially autonomous robot. The control signal (A) may then be determined in accordance with this information, for example to avoid collisions with the detected objects.

The actuator (10), which is preferably integrated in the vehicle (100), may be given by a brake, a propulsion system, an engine, a drivetrain, or a steering of the vehicle (100). The control signal (A) may be determined such that the actuator (10) is controlled such that vehicle (100) avoids collisions with the detected objects. The detected objects may also be classified according to what the image classifier (60) deems them most likely to be, e.g., pedestrians or trees, and the control signal (A) may be determined depending on the classification.

Alternatively or additionally, the control signal (A) may also be used to control a display (10a), e.g., for displaying the objects detected by the image classifier (60). It can also be provided that the control signal (A) may control the display (10a) such that it produces a warning signal, if the vehicle (100) is close to colliding with at least one of the detected objects. The warning signal may be a warning sound and/or a haptic signal, e.g., a vibration of a steering wheel of the vehicle.

The factors ($z_1$, $z_2$, $z_3$, $z_4$) obtained for the input image (x) may, for example, be displayed on the display (10a). A driver of the vehicle (100) would hence be given insight into what factors ($z_1$, $z_2$, $z_3$, $z_4$) caused the image classifier (60) to determine a presence or absence of objects in the vicinity of the vehicle (100). If a classification was based on at least one wrong or ill-advised factor ($z_1$, $z_2$, $z_3$, $z_4$), the driver could, for example, take over manual control of the vehicle (100).

In even further embodiments, the factors ($z_1$, $z_2$, $z_3$, $z_4$) could also be transmitted to an operator of the vehicle. The operator does not necessarily have to be inside of the vehicle (100) but could be located outside of the vehicle (100). In this case, the factors could be transmitted to the operator by means of a wireless transmission system of the vehicle (100), e.g., by means of a cellular network. If a classification was based on at least one wrong or ill-advised factor ($z_1$, $z_2$, $z_3$, $z_4$), the operator could, for example, take over manual control of the vehicle or issue an control signal (A) that causes the vehicle (100) to assume a safe state, e.g., pull over to a side of a road the vehicle (100) is travelling on.

In even further embodiments, the sensor (30) may be a microphone or may comprise a microphone. The classifier (60) could then, for example, be configured to classify audio events in the vicinity of the vehicle (100) and control the vehicle (100) accordingly. For example, if the classifier (60) could detect a siren of a police vehicle or a fire-fighting vehicle. The conversion unit (80) could then determine a control signal (A) such that the vehicle (100) opens up a rescue lane on the road it is currently travelling on.

In even embodiments, the at least partially autonomous robot may be given by another mobile robot (not shown), which may, for example, move by flying, swimming, diving or stepping. The mobile robot may, inter alia, be an at least partially autonomous lawn mower, or an at least partially autonomous cleaning robot. In these further embodiments, the control signal (A) may be determined such that propulsion unit and/or steering and/or brake of the mobile robot are controlled such that the mobile robot may avoid collisions with said identified objects. In these further embodiments, the factors ($z_1$, $z_2$, $z_3$, $z_4$) could also be transmitted to an operator by means of a wireless transmission, e.g., a cellular network.

In a further embodiment, the at least partially autonomous robot may be given by a gardening robot (not shown), which uses the sensor (30), preferably an optical sensor, to determine a state of plants in the environment (20). The actuator (10) may control a nozzle for spraying liquids and/or a cutting device, e.g., a blade. Depending on an identified species and/or an identified state of the plants, an control signal (A) may be determined to cause the actuator (10) to spray the plants with a suitable quantity of suitable liquids and/or cut the plants.

In even further embodiments, the at least partially autonomous robot may be given by a domestic appliance (not shown), like e.g. a washing machine, a stove, an oven, a microwave, or a dishwasher. The sensor (30), e.g., an optical sensor, may detect a state of an object which is to undergo processing by the household appliance. For example, in the case of the domestic appliance being a washing machine, the sensor (30) may detect a state of the laundry inside the washing machine. The control signal (A) may then be determined depending on a detected material of the laundry.

Figure 4:
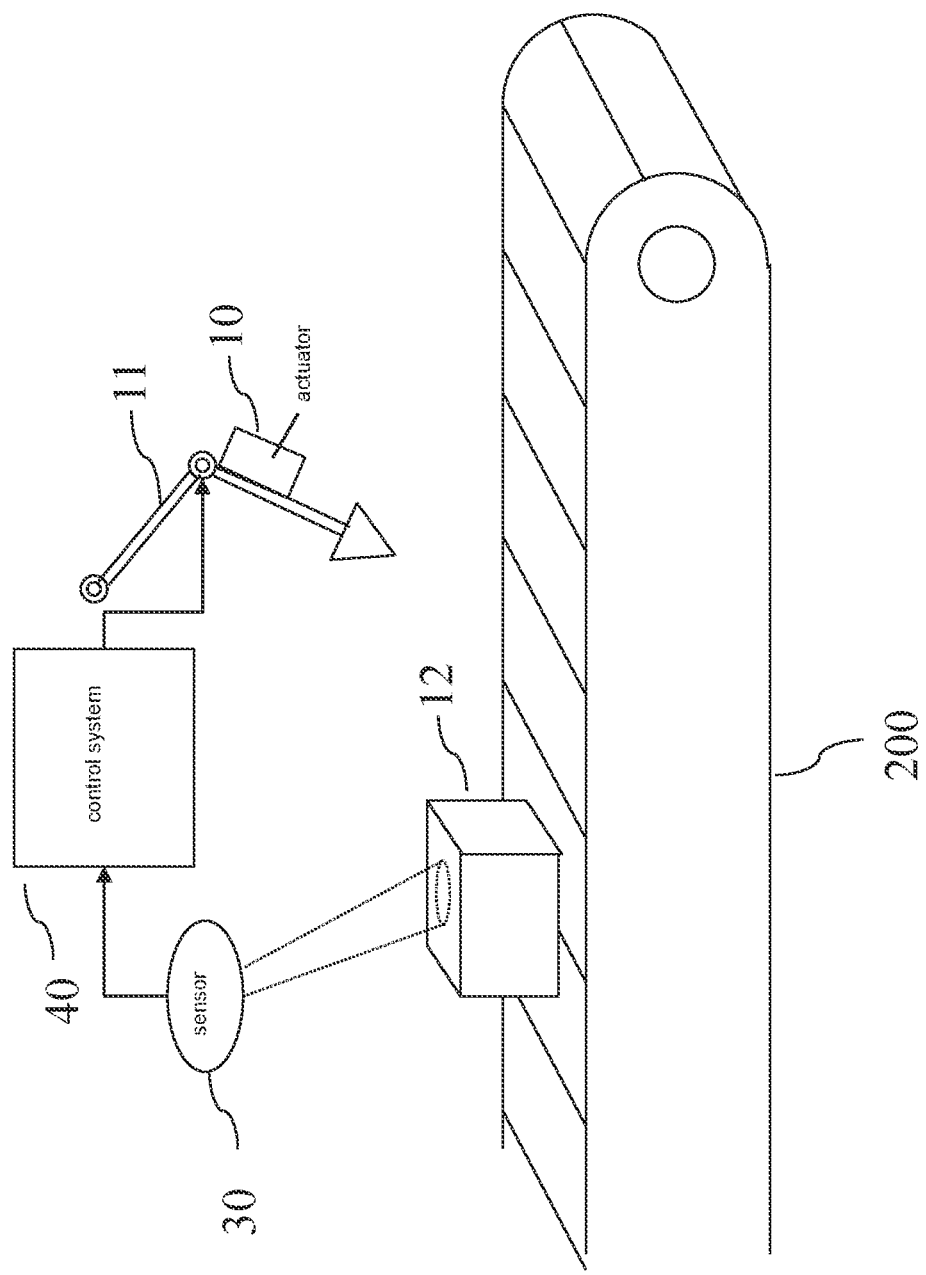
FIG. 4 shows the control system controlling a manufacturing machine, in accordance with an example embodiment of the present invention.

Shown in FIG. 4 is an embodiment in which the control system (40) is used to control a manufacturing machine (11), e.g., a punch cutter, a cutter, a gun drill or a gripper, of a manufacturing system (200), e.g., as part of a production line. The manufacturing machine may comprise a transportation device, e.g., a conveyer belt or an assembly line, which moves a manufactured product (12). The control system (40) controls an actuator (10), which in turn controls the manufacturing machine (11).

The sensor (30) may be given by an optical sensor which captures properties of, e.g., a manufactured product (12). The classifier (60) may hence be understood as an image classifier.

The image classifier (60) may determine a position of the manufactured product (12) with respect to the transportation device. The actuator (10) may then be controlled depending on the determined position of the manufactured product (12) for a subsequent manufacturing step of the manufactured product (12). For example, the actuator (10) may be controlled to cut the manufactured product at a specific location of the manufactured product itself. Alternatively, it may be provided that the image classifier (60) classifies, whether the manufactured product is broken or exhibits a defect. The actuator (10) may then be controlled as to remove the manufactured product from the transportation device.

The factors ($z_1$, $z_2$, $z_3$, $z_4$) obtained for the input image (x) may, for example, be displayed on a display (10a). An operator of the manufacturing system (200) would hence be given insight into what factors ($z_1$, $z_2$, $z_3$, $z_4$) caused the image classifier (60) to determine the output signal (y). If a classification was based on at least one wrong or ill-advised factor ($z_1$, $z_2$, $z_3$, $z_4$), the operator could, for example, take over manual control of the manufacturing system (200).

Figure 5:
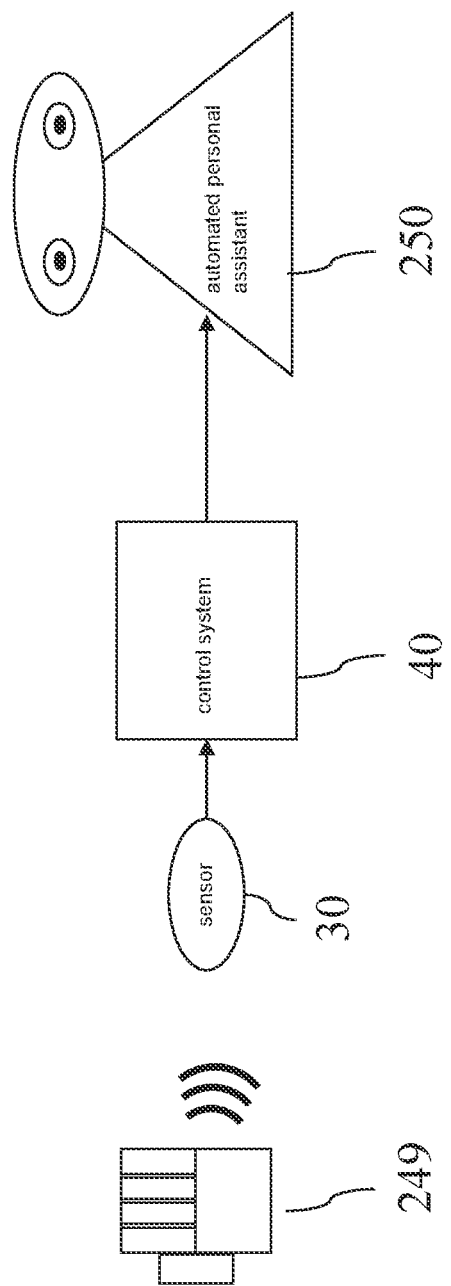
FIG. 5 shows the control system controlling an automated personal assistant, in accordance with an example embodiment of the present invention.

Shown in FIG. 5 is an embodiment in which the control system (40) is used for controlling an automated personal assistant (250). The sensor (30) may be an optic sensor, e.g., for receiving video images of a gestures of a user (249). Alternatively, the sensor (30) may also be an audio sensor, e.g., for receiving a voice command of the user (249).

The control system (40) then determines control signals (A) for controlling the automated personal assistant (250). The control signals (A) are determined in accordance with the sensor signal (S) of the sensor (30). The sensor signal (S) is transmitted to the control system (40). For example, the classifier (60) may be configured to, e.g., carry out a gesture recognition algorithm to identify a gesture made by the user (249). The control system (40) may then determine a control signal (A) for transmission to the automated personal assistant (250). It then transmits the control signal (A) to the automated personal assistant (250).

For example, the control signal (A) may be determined in accordance with the identified user gesture recognized by the classifier (60). It may comprise information that causes the automated personal assistant (250) to retrieve information from a database and output this retrieved information in a form suitable for reception by the user (249).

In further embodiments, it may be provided that instead of the automated personal assistant (250), the control system (40) controls a domestic appliance (not shown) controlled in accordance with the identified user gesture. The domestic appliance may be a washing machine, a stove, an oven, a microwave or a dishwasher.

Figure 6:
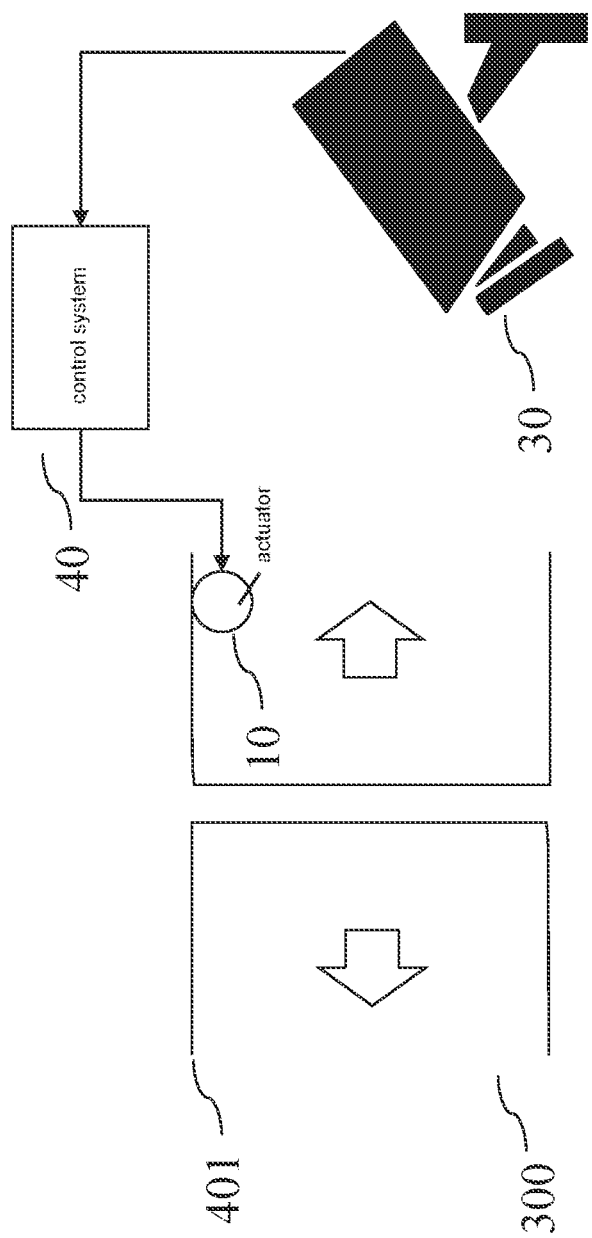
FIG. 6 shows the control system controlling an access control system, in accordance with an example embodiment of the present invention.

Shown in FIG. 6 is an embodiment in which the control system (40) controls an access control system (300). The access control system (300) may be designed to physically control access. It may, for example, comprise a door (401). The sensor (30) can be configured to detect a scene that is relevant for deciding whether access is to be granted or not. It may, for example, be an optical sensor for providing image or video data, e.g., for detecting a person's face. The classifier (60) may hence be understood as an image classifier.

The image classifier (60) may be configured to classify an identity of the person, e.g., by matching the detected face of the person with other faces of known persons stored in a database, thereby determining an identity of the person. The control signal (A) may then be determined depending on the classification of the image classifier (60), e.g., in accordance with the determined identity. The actuator (10) may be a lock which opens or closes the door depending on the control signal (A). Alternatively, the access control system (300) may be a non-physical, logical access control system. In this case, the control signal may be used to control a display (10a) to show information about the person's identity and/or whether the person is to be given access.

The factors ($z_1$, $z_2$, $z_3$, $z_4$) obtained for the input image (x) may, for example, be displayed on the display (10a). An operator of the access control system (300) would hence be given insight into what factors ($z_1$, $z_2$, $z_3$, $z_4$) caused the image classifier (60) to determine the output signal (y). If a classification was based on at least one wrong or ill-advised factor ($z_1$, $z_2$, $z_3$, $z_4$), the operator could, for example, deny access.

Figure 7:
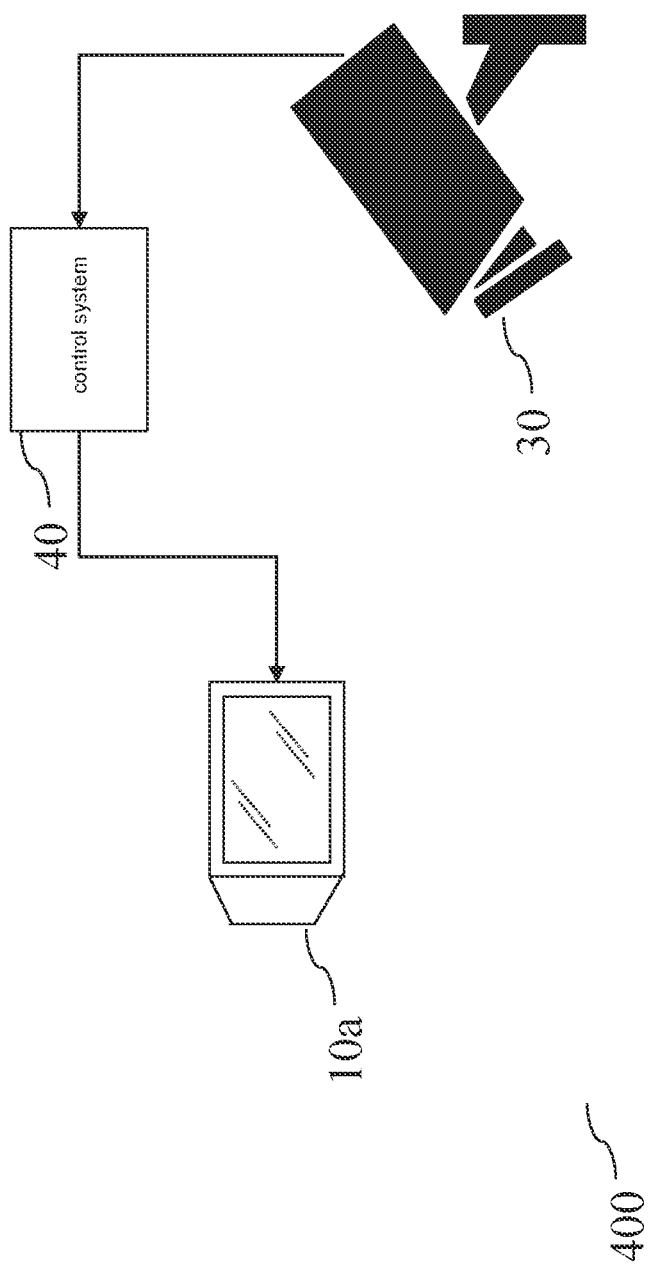
FIG. 7 shows the control system controlling a surveillance system, in accordance with an example embodiment of the present invention.

Shown in FIG. 7 is an embodiment in which the control system (40) controls a surveillance system (400). This embodiment is largely identical to the embodiment shown in FIG. 6. Therefore, only the differing aspects will be described in detail. The sensor (30) is configured to detect a scene that is under surveillance. The control system (40) does not necessarily control an actuator (10), but may alternatively control a display (10a). For example, the image classifier (60) may determine a classification of a scene, e.g., whether the scene detected by an optical sensor (30) is normal or whether the scene exhibits an anomaly. The control signal (A), which is transmitted to the display (10a), may then, for example, be configured to cause the display (10a) to adjust the displayed content dependent on the determined classification, e.g., to highlight an object that is deemed anomalous by the image classifier (60).

Figure 8:
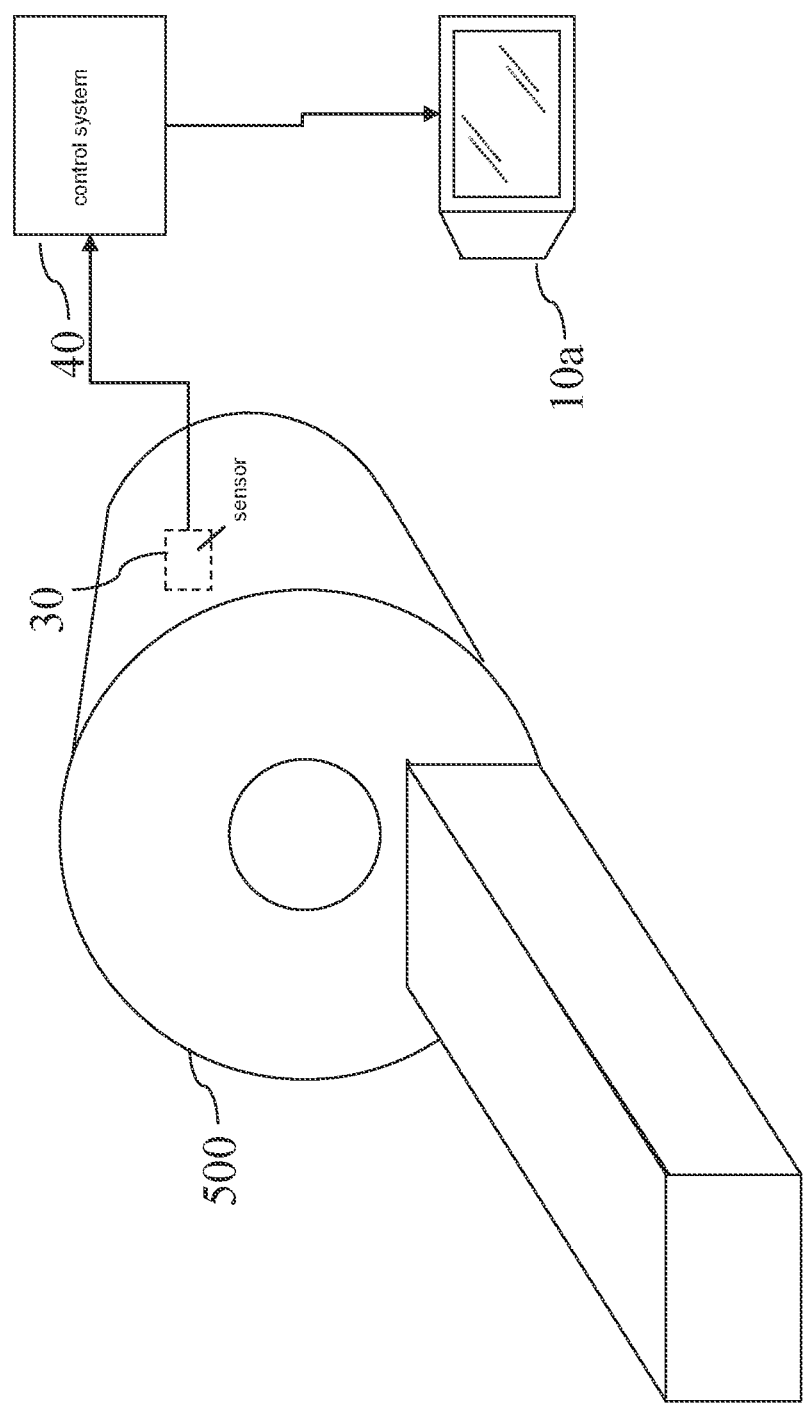
FIG. 8 shows the control system controlling an imaging system, in accordance with an example embodiment of the present invention.

Shown in FIG. 8 is an embodiment of a medical imaging system (500) controlled by the control system (40). The imaging system may, for example, be an MRI apparatus, x-ray imaging apparatus or ultrasonic imaging apparatus. The sensor (30) may, for example, be an imaging sensor which takes at least one image of a patient, e.g., displaying different types of body tissue of the patient.

The classifier (60) may then determine a classification of at least a part of the sensed image. The at least part of the image is hence used as input image (x) to the classifier (60). The classifier (60) may hence be understood as an image classifier.

The control signal (A) may then be chosen in accordance with the classification, thereby controlling a display (10a). For example, the image classifier (60) may be configured to detect different types of tissue in the sensed image, e.g., by classifying the tissue displayed in the image into either malignant or benign tissue. This may be done by means of a semantic segmentation of the input image (x) by the image classifier (60). The control signal (A) may then be determined to cause the display (10a) to display different tissues, e.g., by displaying the input image (x) and coloring different regions of identical tissue types in a same color.

The factors ($z_1$, $z_2$, $z_3$, $z_4$) obtained for the input image (x) may, for example, be displayed on the display (10a). An operator of the imaging system (500) would hence be given insight into what factors ($z_1$, $z_2$, $z_3$, $z_4$) caused the image classifier (60) to determine the output signal (y). If a classification was based on at least one wrong or ill-advised factor ($z_1$, $z_2$, $z_3$, $z_4$), the operator could, for example, further inspect the input image (x).

In further embodiments (not shown) the imaging system (500) may be used for non-medical purposes, e.g., to determine material properties of a workpiece. In these embodiments, the image classifier (60) may be configured to receive an input image (x) of at least a part of the workpiece and perform a semantic segmentation of the input image (x), thereby classifying the material properties of the workpiece. The control signal (A) may then be determined to cause the display (10a) to display the input image (x) as well as information about the detected material properties.

Figure 9:
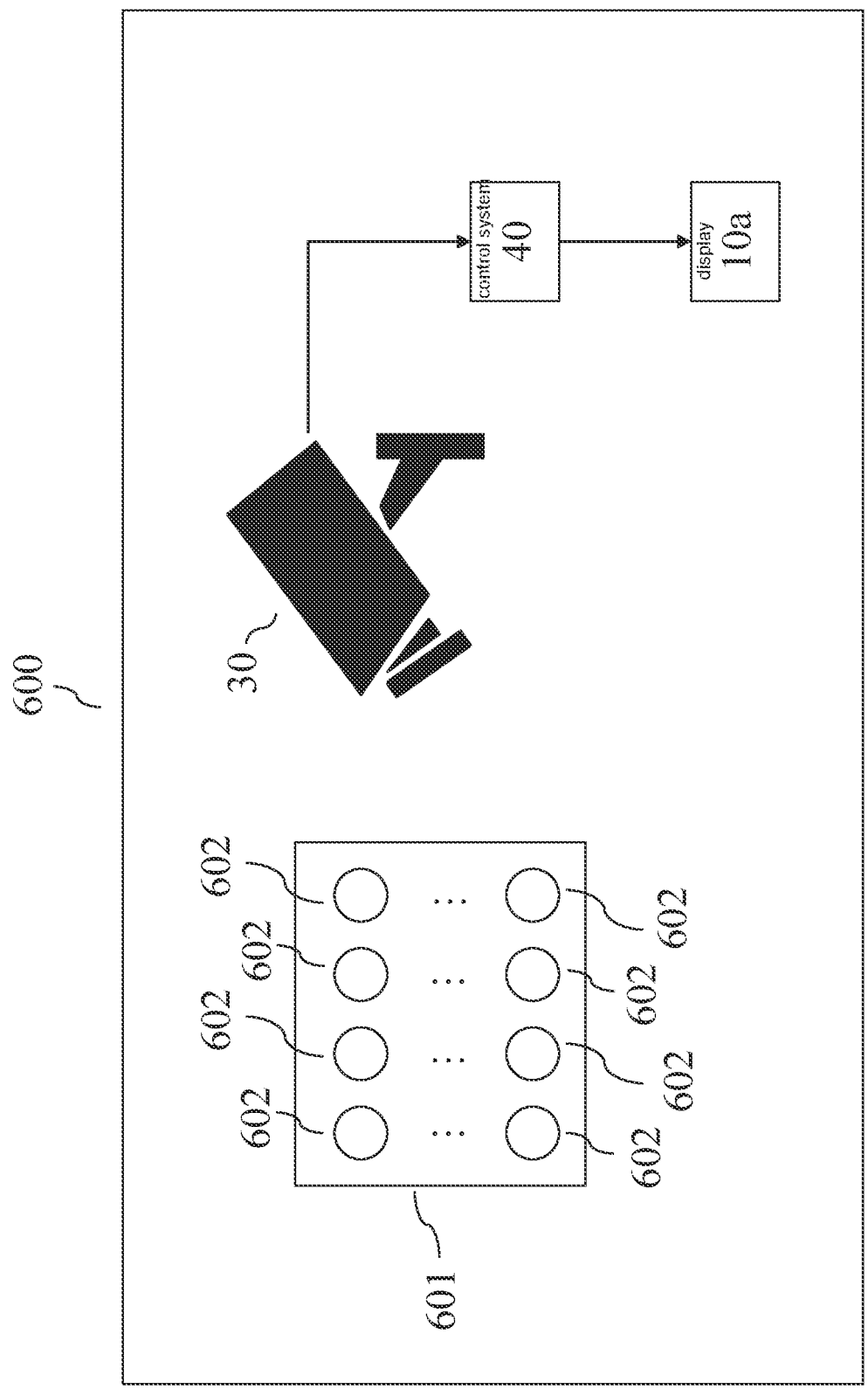
FIG. 9 shows the control system controlling a medical analysis system, in accordance with an example embodiment of the present invention.

Shown in FIG. 9 is an embodiment of a medical analysis system (600) being controlled by the control system (40). The medical analysis system (600) is supplied with a microarray (601), wherein the microarray comprises a plurality of spots (602, also known as features) which have been exposed to a medical specimen. The medical specimen may, for example, be a human specimen or an animal specimen, e.g., obtained from a swab.

The microarray (601) may be a DNA microarray or a protein microarray.

The sensor (30) is configured to sense the microarray (601). The sensor (30) is preferably an optical sensor such as a video sensor. The classifier (60) may hence be understood as an image classifier.

The image classifier (60) is configured to classify a result of the specimen based on an input image (x) of the microarray supplied by the sensor (30). In particular, the image classifier (60) may be configured to determine whether the microarray (601) indicates the presence of a virus in the specimen.

The control signal (A) may then be chosen such that the display (10a) shows the result of the classification.

The factors ($z_1$, $z_2$, $z_3$, $z_4$) obtained for the input image (x) may, for example, be displayed on the display (10a). An operator of the analysis system (600) would hence be given insight into what factors ($z_1$, $z_2$, $z_3$, $z_4$) caused the image classifier (60) to determine the output signal (y). If a classification was based on at least one wrong or ill-advised factor ($z_1$, $z_2$, $z_3$, $z_4$), the operator could, for example, further inspect the specimen or issue another test or issue another swab.

Figure 10:
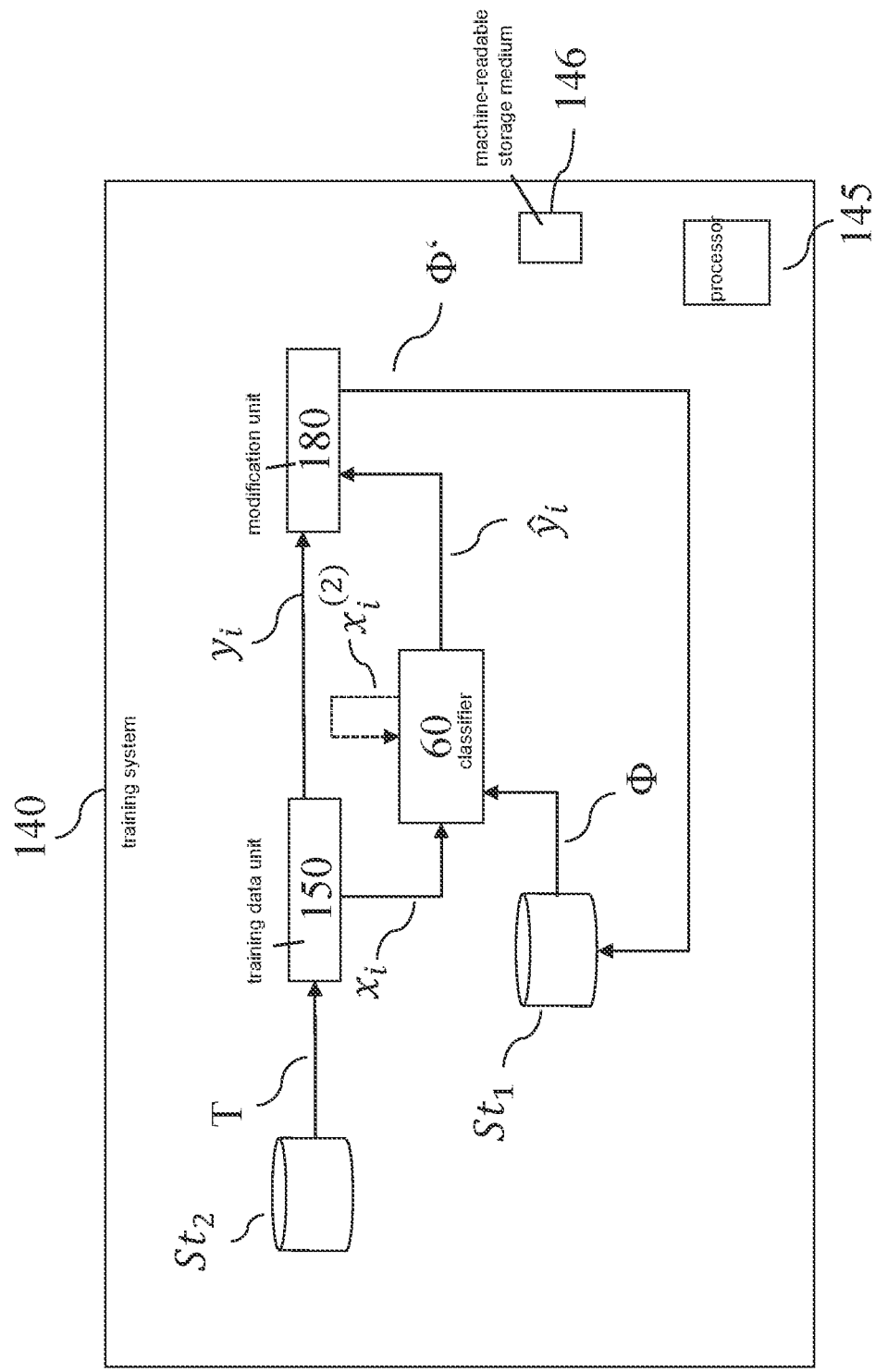
FIG. 10 shows a training system for training the classifier, in accordance with an example embodiment of the present invention.

FIG. 10 shows an embodiment of a training system (140) for training the classifier (60) of the control system (40) by means of a training data set (T). The training data set (T) comprises a plurality of input signals ($x_i$) which are used for training the classifier (60), wherein the training data set (T) further comprises, for each input signal ($x_i$), a desired output signal ($y_i$) which corresponds to the input signal ($x_i$) and characterizes a classification of the input signal ($x_i$).

For training, a training data unit (150) accesses a computer-implemented database ($St_2$), the database ($St_2$) providing the training data set (T). The training data unit (150) determines from the training data set (T) preferably randomly at least one input signal ($x_i$) and the desired output signal ($y_i$) corresponding to the input signal ($x_i$) and transmits the input signal ($x_i$) to the classifier (60).

The classifier (60) determines a latent representation (z) of the input signal ($x_i$) by means of the invertible factorization model (61). The latent representation (z) is then adapted by changing a desired factor or a desired plurality of factors according to which feature of the input signal ($x_i$) shall be changed. For example, a factor relating to contrast may be adapted. The adapted latent representation is then propagated backwards through the invertible factorization model to determine a second input signal ($x_i^{(2)}$). Based on the second input signal ($x_i^{(2)}$), the classifier (60) then determines an output signal ($\hat{y}_i$).

The desired output signal ($y_i$) and the determined output signal ($\hat{y}_i$) are transmitted to a modification unit (180).

Based on the desired output signal ($y_i$) and the determined output signal ($\hat{y}_i$), the modification unit (180) then determines new parameters ($\Phi'$) for the classifier (60). For this purpose, the modification unit (180) compares the desired output signal ($y_i$) and the determined output signal ($\hat{y}_i$) using a loss function. The loss function determines a first loss value that characterizes how far the determined output signal ($\hat{y}_i$) deviates from the desired output signal ($y_i$). In the given embodiment, a negative log-likelihood function is used as the loss function. Other loss functions are also possible in alternative embodiments.

Furthermore, it is possible that the determined output signal ($\hat{y}_i$) and the desired output signal ($y_i$) each comprise a plurality of sub-signals, for example in the form of tensors, wherein a sub-signal of the desired output signal ($y_i$) corresponds to a sub-signal of the determined output signal ($\hat{y}_i$). It is possible, for example, that the classifier (60) is configured for object detection and a first sub-signal characterizes a probability of occurrence of an object with respect to a part of the input signal ($x_i$) and a second sub-signal characterizes the exact position of the object. If the determined output signal ($\hat{y}_i$) and the desired output signal ($y_i$) comprise a plurality of corresponding sub-signals, a second loss value is preferably determined for each corresponding sub-signal by means of a suitable loss function and the determined second loss values are suitably combined to form the first loss value, for example by means of a weighted sum.

The modification unit (180) determines the new parameters ($\Phi'$) based on the first loss value. In the given embodiment, this is done using a gradient descent method, preferably stochastic gradient descent, Adam, or AdamW.

In other preferred embodiments, the described training is repeated iteratively for a predefined number of iteration steps or repeated iteratively until the first loss value falls below a predefined threshold value. Alternatively or additionally, it is also possible that the training is terminated when an average first loss value with respect to a test or validation data set falls below a predefined threshold value. In at least one of the iterations the new parameters ($\Phi'$) determined in a previous iteration are used as parameters ($\Phi$) of the classifier (60).

In even further embodiments, the classifier is trained based on a neural architecture search algorithm, wherein at least the plurality of functions ($F_1$, $F_2$, $F_3$, $F_4$) of the invertible factorization model (61) of the classifier (60) is determined based on the neural architecture search algorithm. As neural architecture search algorithm, the LEMONADE algorithm is used in this embodiment. However in other embodiments other neural architecture search algorithms are also possible. As objective for the LEMONADE algorithm, DCI Disentanglement and classification accuracy of the image classifier (60) can be chosen.

Furthermore, the training system (140) may comprise at least one processor (145) and at least one machine-readable storage medium (146) containing instructions which, when executed by the processor (145), cause the training system (140) to execute a training method according to one of the aspects of the present invention.

The term "computer" may be understood as covering any devices for the processing of pre-defined calculation rules. These calculation rules can be in the form of software, hardware or a mixture of software and hardware.

In general, a plurality can be understood to be indexed, that is, each element of the plurality is assigned a unique index, preferably by assigning consecutive integers to the elements contained in the plurality. Preferably, if a plurality has N elements, wherein N is the number of elements in the plurality, the elements are assigned the integers from 1 to N. It may also be understood that elements of the plurality can be accessed by their index.

What is claimed is:

1. A computer-implemented method for training a classifier, wherein the classifier is configured to determine an output signal characterizing a classification of an input signal, the method comprising the following steps:
   determining a first training input signal from a training data set, wherein the training data set comprises, for each input signal, a corresponding output signal;
   determining a first latent representation including a plurality of factors based on the first training input signal using an invertible factorization model,
   wherein the invertible factorization model includes:
   a plurality of functions, wherein each function from the plurality of functions is continuous and continuously differentiable in at least a portion thereof, wherein the function is further configured to accept either the training input signal or at least one of the factors provided by another function of the plurality of functions as an input and wherein each function of the plurality of functions is further configured to provide at least one of the factors, wherein the at least one of the factors is either provided as at least part of the latent representation or is provided as at least part of an input of another function of the plurality of functions, wherein the plurality of factors of the latent representation are provided at least by two different functions of the plurality of functions, wherein a respective function of the plurality of functions of the invertible factorization model is invertible, wherein for each respective function there exists a corresponding inverse function, wherein each inverse function is continuous, is continuously differentiable in at least a portion thereof and is configured to determine an input of the respective function based on the at least one factor provided from the function;
   determining a second latent representation by changing at least one of the factors of the first latent representation;
   determining a second training input signal based on the second latent representation using the invertible factorization model using backward propagation;
   training the classifier based on the second training input signal by determining with the classifier based on a second input signal an output signal and comparing the determined output signal to a respective corresponding output signal; and
   providing an actuator configured to control, based on the output signal of the trained classifier, a physical action of a vehicle, a robot, or a machine.

2. The method according to claim 1, wherein the classifier includes the invertible factorization model and the output signal is determined based on a latent representation of the input signal, wherein the latent representation is determined using the invertible factorization model.

3. The method according to claim 1, wherein the plurality of functions of the invertible factorization model includes at least one function that provides a first factor to the latent representation and provides a second factor to another function of the plurality of functions.

4. The method according to claim 1, wherein the plurality of functions of the invertible factorization model includes at least one function that is configured to provide two factors according to the formula $$f(x^{(i)})=(z_1,z_2)=(\varepsilon(x^{(i)}),x^{(i)}-\mathcal{D}(\varepsilon(x^{(i)}))),$$

wherein $x^{(i)}$ is an input of the at least one function, $z_1$ is a first factor, $z_2$ is a second factor, $\varepsilon$ is an encoder of an autoencoder and $\mathcal{D}$ is a decoder of the autoencoder, further wherein an inverse function corresponding with the function is given by $$f^{-1}(z_1,z_2)=\mathcal{D}(z_1)+z_2.$$

5. The method according to claim 4, wherein the method further includes training the encoder and/or the decoder based on a loss function $$l(x^{(i)})=\Sigma(x^{(i)}-\mathcal{D}(\varepsilon(x^{(i)})))^2,$$

wherein $x^{(i)}$ is an input of the loss function and the sum is over all squared elements of the subtraction.

6. The method according to claim 1, wherein the plurality of functions of the invertible factorization model includes at least one function that is configured to provide three factors according to the formula $$f(x^{(i)})=(z_1,z_2,z_3),$$

wherein $x^{(i)}$ is an input of the at least one function, $z_1$ is a first factor and a result of applying a group normalization to the input $x^{(i)}$, $z_2$ is a second factor and an expected value of the group normalization, $z_3$ is a third factor and a standard deviation of the group normalization and the group normalization further depends on a scale parameter $\gamma$ and a shift parameter $\beta$, wherein an inverse of the function is given by $$f^{-1}(z_1,z_2,z_3)=z_3\frac{z_1-\beta}{\gamma}+z_2.$$

7. The method according to claim 1, wherein the plurality of functions of the invertible factorization model includes at least one function that provides two factors according to the formula $$f(x^{(i)})=(z_1,z_2)=(\mathrm{ReLU}(x^{(i)}),\mathrm{ReLU}(-x^{(i)})),$$

wherein $x^{(i)}$ is an input of the at least one function, $z_1$ is a first factor, $z_2$ is a second factor and ReLU is a rectified linear unit, further wherein the inverse function for the at least one function is given by $$f^{-1}(z_1,z_2)=z_1-z_2.$$

8. The method according to claim 1, wherein the training of the classifier includes training the invertible factorization model by adapting a plurality of parameters of the invertible factorization model according to a loss function $$l(z)=\|z-f(f^{-1}(z))\|_2^2,$$

wherein z is a latent representation, $f(\bullet)$ describes applying the invertible factorization model to an input signal (x) in order to obtain a latent representation and $f^{-1}(\bullet)$ describes applying the invertible factorization model to a latent representation in order to obtain an input signal.

9. The method according to claim 1, wherein the training of the classifier further comprises training the invertible factorization model using a neural architecture search algorithm, wherein an objective function of the neural architecture search algorithm is based on maximizing a disentanglement of a plurality of factors of a latent representation provided by the invertible factorization model.

10. The method according to claim 1, wherein a device is controlled based on the output signal.

11. A classifier configured to determine an output signal characterizing a classification of an input signal, the classifier being trained by:
  determining a first training input signal from a training data set, wherein the training data set comprises, for each input signal, a corresponding output signal;
  determining a first latent representation including a plurality of factors based on the first training input signal using an invertible factorization model,
  wherein the invertible factorization model includes:
  a plurality of functions, wherein each function from the plurality of functions is continuous and continuously differentiable in at least a portion thereof, wherein the function is further configured to accept either the training input signal or at least one of the factors provided by another function of the plurality of functions as an input and wherein each function of the plurality of functions is further configured to provide at least one of the factors, wherein the at least one of the factors is either provided as at least part of the latent representation or is provided as at least part of an input of another function of the plurality of functions, wherein the plurality of factors of the latent representation are provided at least by two different functions of the plurality of functions, wherein a respective function of the plurality of functions of the invertible factorization model is invertible, wherein for each respective function there exists a corresponding inverse function, wherein each inverse function is continuous, is continuously differentiable in at least a portion thereof and is configured to determine an input of the respective function based on the at least one factor provided from the function;
  determining a second latent representation by changing at least one of the factors of the first latent representation;
  determining a second training input signal based on the second latent representation using the invertible factorization model using backward propagation;
  training the classifier based on the second training input signal by determining with the classifier based on a second input signal an output signal and comparing the determined output signal to a respective corresponding output signal, wherein an actuator is configured to control, based on the output signal of the trained classifier, a physical action of a vehicle, a robot, or a machine.

12. A training system configured to train a classifier, wherein the classifier is configured to determine an output signal characterizing a classification of an input signal, the training system configured to:
  determining a first training input signal from a training data set, wherein the training data set comprises, for each input signal, a corresponding output signal;
  determining a first latent representation including a plurality of factors based on the first training input signal using an invertible factorization model,
  wherein the invertible factorization model includes:
  a plurality of functions, wherein each function from the plurality of functions is continuous and continuously differentiable in at least a portion thereof, wherein the function is further configured to accept either the training input signal or at least one of the factors provided by another function of the plurality of functions as an input and wherein each function of the plurality of functions is further configured to provide at least one of the factors, wherein the at least one of the factors is either provided as at least part of the latent representation or is provided as at least part of an input of another function of the plurality of functions, wherein the plurality of factors of the latent representation are provided at least by two different functions of the plurality of functions, wherein a respective function of the plurality of functions of the invertible factorization model is invertible, wherein for each respective function there exists a corresponding inverse function, wherein each inverse function is continuous, is continuously differentiable in at least a portion thereof and is configured to determine an input of the respective function based on the at least one factor provided from the function;
  determining a second latent representation by changing at least one of the factors of the first latent representation;
  determining a second training input signal based on the second latent representation using the invertible factorization model using backward propagation;
  training the classifier based on the second training input signal by determining with the classifier based on a second input signal an output signal and comparing the determined output signal to a respective corresponding output signal, wherein an actuator is configured to control, based on the output signal of the trained classifier, a physical action of a vehicle, a robot, or a machine.

13. A non-transitory machine-readable storage medium which is stored a computer program for training a classifier, wherein the classifier is configured to determine an output signal characterizing a classification of an input signal,
  the computer program, when executed by a processor, causing the processor to perform the following steps:
  determining a first training input signal from a training data set, wherein the training data set comprises, for each input signal, a corresponding output signal;
  determining a first latent representation including a plurality of factors based on the first training input signal using an invertible factorization model,
  wherein the invertible factorization model includes:
  a plurality of functions, wherein each function from the plurality of functions is continuous and continuously differentiable in at least a portion thereof, wherein the function is further configured to accept either the training input signal or at least one of the factors provided by another function of the plurality of functions as an input and wherein each function of the plurality of functions is further configured to provide at least one of the factors, wherein the at least one of the factors is either provided as at least part of the latent representation or is provided as at least part of an input of another function of the plurality of functions, wherein the plurality of factors of the latent representation are provided at least by two different functions of the plurality of functions, wherein a respective function of the plurality of functions of the invertible factorization model is invertible, wherein for each respective function there exists a corresponding inverse function, wherein each inverse function is continuous, is continuously differentiable in at least a portion thereof and is configured to determine an input of the respective function based on the at least one factor provided from the function;

determining a second latent representation by changing at least one of the factors of the first latent representation;

determining a second training input signal based on the second latent representation using the invertible factorization model using backward propagation;

training the classifier based on the second training input signal by determining with the classifier based on a second input signal an output signal and comparing the determined output signal to a respective corresponding output signal, wherein an actuator is configured to control, based on the output signal of the trained classifier, a physical action of a vehicle, a robot, or a machine.

* * * * *